(12) United States Patent
Lewis et al.

(10) Patent No.: US 7,668,468 B1
(45) Date of Patent: Feb. 23, 2010

(54) NUMEROUS USER LASER COMMUNICATIONS OPTICAL SYSTEM USING CHROMATIC WAVEPLATES AND A COMMON TELESCOPE APERTURE

(75) Inventors: Isabella T. Lewis, San Jose, CA (US); Robert W. Kaliski, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 662 days.

(21) Appl. No.: 11/238,755

(22) Filed: Sep. 28, 2005

Related U.S. Application Data

(60) Provisional application No. 60/615,241, filed on Oct. 1, 2004.

(51) Int. Cl.
*H04B 10/00* (2006.01)
(52) U.S. Cl. ............... 398/205; 398/207; 398/212; 398/152; 398/118
(58) Field of Classification Search ........... 398/140, 398/152, 118, 158–159, 205, 208, 212
See application file for complete search history.

(56) References Cited

U.S. PATENT DOCUMENTS

| | | | | |
|---|---|---|---|---|
| 3,700,309 A | * | 10/1972 | Skolnick et al. | 359/577 |
| 3,724,938 A | * | 4/1973 | Nepela | 353/20 |
| 3,971,930 A | * | 7/1976 | Fitzmaurice et al. | 398/213 |
| 4,025,194 A | | 5/1977 | Teppo | 356/5 |
| 4,872,015 A | | 10/1989 | Rosen | 342/353 |
| 5,030,004 A | | 7/1991 | Grant et al. | 356/153 |
| 5,062,150 A | | 10/1991 | Swanson et al. | 359/152 |
| 5,090,795 A | | 2/1992 | O'Meara et al. | 359/240 |
| 5,113,131 A | * | 5/1992 | Cooper et al. | 324/96 |
| 5,119,225 A | | 6/1992 | Grant et al. | 359/172 |
| 5,218,467 A | | 6/1993 | Ross et al. | 359/172 |
| 5,282,073 A | | 1/1994 | Defour et al. | 359/159 |
| 5,347,387 A | | 9/1994 | Rice | |
| 5,475,520 A | | 12/1995 | Wissinger | 359/172 |
| 5,530,577 A | | 6/1996 | Orino et al. | 359/152 |
| 5,627,669 A | | 5/1997 | Orino et al. | |
| 5,659,413 A | | 8/1997 | Carlson | 359/172 |
| 5,710,652 A | | 1/1998 | Bloom et al. | 359/152 |

(Continued)

OTHER PUBLICATIONS

Walther, Frederick G. et al., U.S. Appl. No. 60/422,185, filed Oct. 29, 2002, pp. 1-26.

(Continued)

*Primary Examiner*—Agustin Bello
(74) *Attorney, Agent, or Firm*—Sheridan Ross P.C.

(57) ABSTRACT

The present invention relates to a numerous user laser communications optical system. Numerous optical signals comprising a number of channels are simultaneously received and demultiplexed (and/or multiplexed and transmitted) at a numerous access communication device. The numerous access communication device may comprise multiple stages that each include a multiple order waveplate and a polarizing beam splitter. The multiple order waveplate is configured so that it retards a first electrical field component of signals corresponding to certain channels in a frequency grid in an integer multiple of wavelengths with respect to a second electrical field component, and retards a first electrical field component of signals corresponding to other channels in the frequency grid in an integer multiple of wavelengths plus one-half a wavelength with respect to a second electrical field component. Separation can then be performed on the basis of the resulting opposite polarization.

22 Claims, 6 Drawing Sheets

U.S. PATENT DOCUMENTS

| | | | |
|---|---|---|---|
| 5,726,786 A | 3/1998 | Heflinger | 359/152 |
| 5,734,504 A | 3/1998 | Billman | 359/618 |
| 5,777,768 A | 7/1998 | Korevaar | 359/172 |
| 5,788,632 A * | 8/1998 | Pezzaniti et al. | 600/316 |
| 5,898,529 A | 4/1999 | Meyer et al. | 359/853 |
| 5,923,452 A | 7/1999 | Carlson | 359/172 |
| 5,974,074 A | 10/1999 | Mayor et al. | 372/106 |
| 5,978,121 A * | 11/1999 | Fischer et al. | 398/131 |
| 6,091,528 A | 7/2000 | Kanda | 359/159 |
| 6,268,944 B1 | 7/2001 | Szapiel | 359/159 |
| 6,297,897 B1 | 10/2001 | Czichy et al. | 359/172 |
| 6,301,037 B1 | 10/2001 | Fischer et al. | 359/180 |
| 6,304,354 B2 | 10/2001 | Carlson | 359/172 |
| 6,327,063 B1 * | 12/2001 | Rockwell | 398/122 |
| 6,335,811 B1 | 1/2002 | Sakanaka | |
| 6,347,001 B1 | 2/2002 | Arnold et al. | 359/159 |
| 6,377,208 B2 | 4/2002 | Chang et al. | 342/357.01 |
| 6,490,104 B1 | 12/2002 | Gleckman et al. | 359/819 |
| 6,496,237 B1 | 12/2002 | Gleckman | 349/62 |
| 6,512,625 B2 | 1/2003 | Mei et al. | 359/290 |
| 6,618,177 B1 | 9/2003 | Kato et al. | |
| 6,671,094 B2 * | 12/2003 | Damask | 359/497 |
| 6,847,457 B2 * | 1/2005 | Tobiason et al. | 356/495 |
| 6,940,593 B2 | 9/2005 | Farr | |
| 7,058,307 B2 * | 6/2006 | Sakanaka | 398/119 |
| 7,277,641 B1 * | 10/2007 | Gleckman | 398/128 |
| 2001/0012142 A1 | 8/2001 | Carlson | 359/159 |
| 2001/0035995 A1 | 11/2001 | Ruggiero | 359/152 |
| 2002/0080452 A1 | 6/2002 | Sakanaka | 359/172 |
| 2002/0131121 A1 | 9/2002 | Jeganathan et al. | 359/152 |
| 2002/0191297 A1 | 12/2002 | Gleckman et al. | 359/629 |
| 2003/0030912 A1 | 2/2003 | Gleckman et al. | 359/633 |
| 2004/0081466 A1 | 4/2004 | Walther et al. | |

OTHER PUBLICATIONS

Official Action for U.S. Appl. No. 10/432,277, mailed Nov. 14, 2006, 12 pages.

Official Action for U.S. Appl. No. 10/432,277, mailed Apr. 18, 2007, 12 pages.

Notice of Allowance for U.S. Appl. No. 10/432,277, mailed Jun. 1, 2007, 4 pages.

U.S. Appl. No. 10/431,277, filed May 6, 2003, Gleckman.

Gurantz, I., et al., "Multiple-Access Communication Using Coded Pulse Interval Modulation," pp. 14.4.1-14.4.5, IEEE, 1980.

* cited by examiner

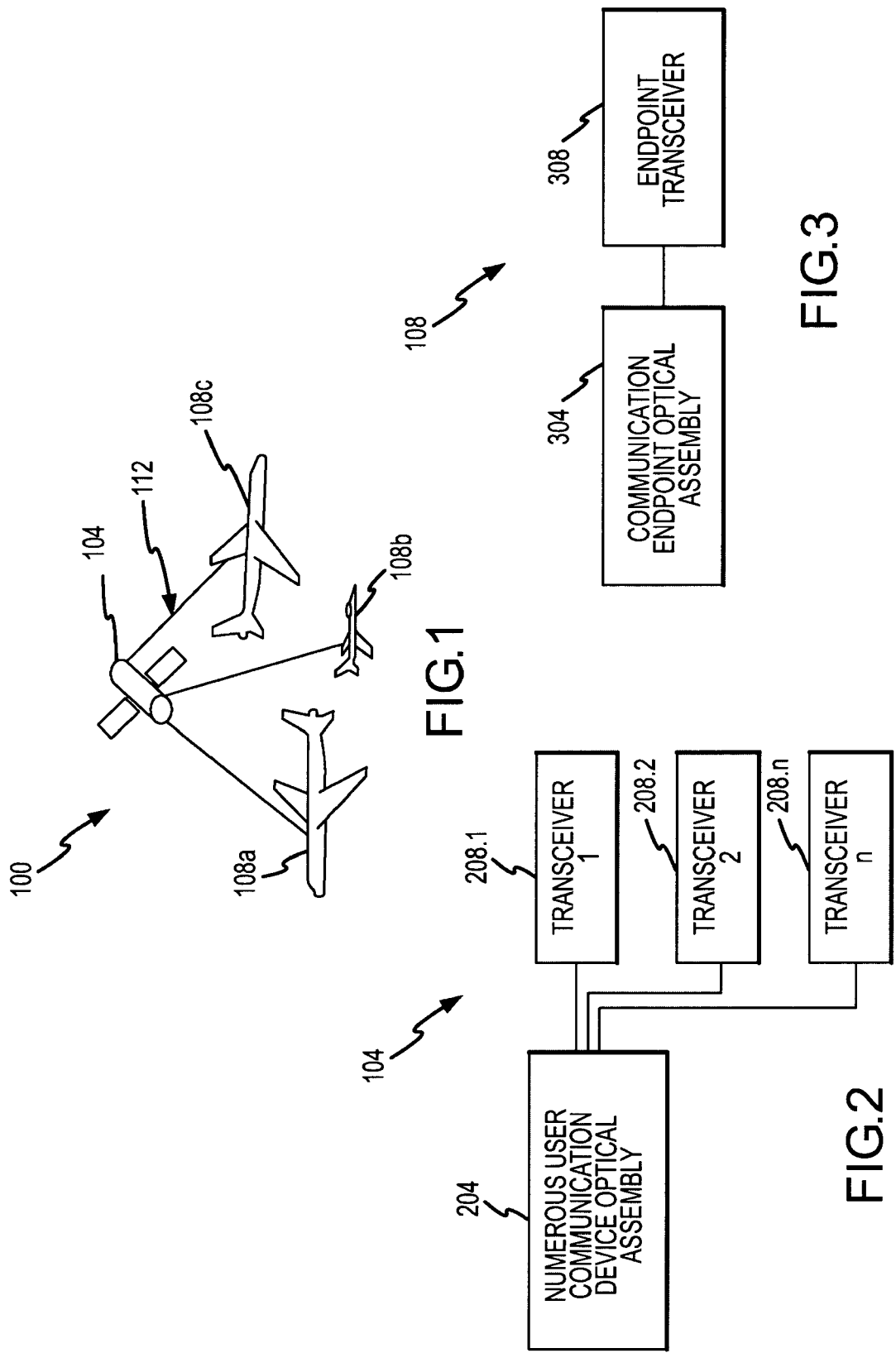

NUMEROUS USER LASER COMMUNICATIONS OPTICAL SYSTEM USING CHROMATIC WAVEPLATES AND A COMMON TELESCOPE APERTURE

CROSS REFERENCE TO RELATED APPLICATIONS

This application claims the benefit of U.S. Provisional Application No. 60/615,241, filed Oct. 1, 2004, the entire disclosure of which is hereby incorporated herein by reference. The present application is related to U.S. patent application Ser. No. 10/431,277, filed May 6, 2003, entitled "Multiple Access Space Communications Optical System Using A Common Telescope Aperture," the entire disclosure of which is incorporated by reference herein in its entirety.

FIELD OF THE INVENTION

The present invention is related to laser communications. In particular, the present invention includes methods and apparatuses using waveplates to differentially polarize signals having different frequencies for separation using a polarizing beam splitter, permitting the simultaneous transmission and/or reception of multiple channels using a single telescope aperture.

BACKGROUND OF THE INVENTION

Communication systems involving the use of satellites are increasingly common. Such systems can be used to transmit data, including real time communications, across large distances. In addition, satellite communication systems used in connection with devices located on or near the surface of the earth can have very large coverage areas.

In a typical communication system, data is transferred between satellites, or between a satellite and communication devices located on or near the surface of the earth, using radio frequencies. Radio frequencies can be projected using broad beams, facilitating the acquisition and tracking of communication devices. However, the bandwidth of radio frequency communication systems is limited.

In order to provide higher bandwidth communications, optical systems, such as systems incorporating laser transmitters, can be used. However, free space optical communication systems have typically been limited to point to point links, where communications are between a single transmitter/receiver and another single transmitter/receiver. One reason that such optical communication systems have been limited to point to point links is that the relatively narrow beams of optical communication systems make the acquisition and tracking of communication endpoints extremely difficult. These same principles can be applied to terrestrial laser communications systems.

In order to permit the acquisition and tracking of communication end points in systems where two communication end points do not have a fixed position with respect to one another, sequential acquisition and communication modes have been proposed. In particular, in the acquisition mode, a relatively broad beam is transmitted. The receiving device, upon detection of the relatively broad beam, may signal the transmitter to effect precise aiming of the signal. Communication may then commence using a communication signal having a relatively narrow beam. However, such systems are not readily adapted to the simultaneous transmission and/or reception of numerous channels at a communication endpoint.

In order to permit the simultaneous reception and/or transmission of numerous channels at a communication endpoint, systems have been proposed that employ a telescope having a field of view that encompasses a number of communication endpoints. Communication endpoints within that field of view are located, and may be communicated with using communication signals having narrow beams. In order to position a receiver or transmitter such that it intercepts a signal beam between a numerous user device and a selected communication endpoint, the receiver and/or transmitter is mechanically positioned within the field of view of the telescope. However, such an approach does not solve the problem of potentially lengthy acquisition times, and difficulties in tracking end points that are moving with respect to the numerous user device. In addition, such an approach requires the use of relatively slow and potentially fragile mechanical devices. Furthermore, where the position of communication endpoints relative to the numerous user device are such that two or more communication endpoints occupy substantially the same position within the field of view of the telescope, the ability to distinguish between signals received from such endpoints, or to direct a transmitted signal to a selected one of such devices, is lost.

In connection with communication systems that transmit data between communication endpoints across optical fibers, different channels may be assigned different frequencies. Filters may then be cascaded to demultiplex the channels having different wavelengths. However, such an approach has not been applied to communication systems capable of supporting a large number of channels. One reason for this is that the passband of filters used to separate different channels from one another moves to shorter wavelengths as the angle of incidence of the light moves from normal to the filter. Where the angle of the signal relative to the filter is known in advance, such shifts in wavelength can be compensated for. However, such an approach cannot be taken where the position of a signal, and in particular the signal's angle of incidence with respect to the filter, is not known beforehand, and therefore can lie within a range of angles. In addition, because demultiplexing a number of signals using band pass filters can require sending signals through a number of filters, attenuation can be a problem.

SUMMARY OF THE INVENTION

Embodiments of the present invention are directed to solving these and other problems and disadvantages of the prior art.

In accordance with embodiments of the present invention, a numerous user laser communication optical system using a single telescope aperture for at least one of reception and transmission of numerous optical signals is provided. As used herein, an optical signal is a signal having a wavelength of from about 800 nm to about 1700 nm in free space. Furthermore, the present invention provides a laser communication system that is capable of establishing simultaneous and discrete communication links with multiple communication endpoints. The laser beams comprising the channels of the system are coded with a wavelength and have the same polarization upon reception or transmission. There are a myriad of techniques available to perform this task known to those skilled in the art. The intervals between wavelengths are selected so that each channel falls on a line of a grid or set of available channels. In connection with receiving channels, a primary differentiating waveplate polarizes even channels in a first direction, and odd channels in a second direction. The differentially polarized channels are then directed along different paths by a primary polarizing beam splitter. Additional sets of waveplates and polarizing beam splitters may be used to further divide channels from one another. As can be appreciated by one of skill in the art, the transmission of channels can be performed by performing operations generally in reverse of those performed during the reception of channels.

In accordance with embodiments of the present invention, available even channels have a wavelength such that the electrical field component of a corresponding signal in a first plane (e.g. the x plane) is retarded in the differentiating waveplate by an integer number of waves with respect to the electrical field component of that signal in a second plane (e.g. the y plane) that is orthogonal to the first plane. Available odd channels have a wavelength such that the electrical field component of a corresponding signal in a first plane (e.g. the x plane) is retarded in the differentiating waveplate by an integer number of waves plus one-half a wave with respect to the electrical field component of that signal in a second plane (e.g. the y plane) that is orthogonal to the first plane. Accordingly, the signal wavelengths, index of refraction of the waveplate, and thickness of the waveplate are selected to meet these conditions for even and odd channels.

In accordance with an embodiment of the present invention, a single telescope aperture having a field of view capable of covering multiple communication endpoints is provided as part of a numerous user communication device. Also provided as part of the numerous user communication device is an optical signal multiplexer/demultiplexer assembly. In general, operating to provide a reception function, the optical signal multiplexer/demultiplexer receives light comprising multiple laser beams or signals from the telescope optical assembly, and demultiplexes the multiple signals, to deliver a single laser beam or signal to each of a plurality of receivers. Alternatively or in addition, an optical signal multiplexer/demultiplexer may operate to provide a transmission function to multiplex a plurality of communication laser beams or signals and provide those signals to a telescope aperture for transmission to communication endpoints.

In an embodiment in which the optical signal multiplexer/demultiplexer both demultiplexes received signals and multiplexes signals for transmission, a single telescope optical assembly may be provided, such that received and transmitted signals are passed through a single telescope optical assembly.

In an embodiment in which an optical signal multiplexer/demultiplexer only multiplexes or demultiplexes signals, a dual telescope architecture may be used. According to a dual telescope embodiment, a first optical signal multiplexer/demultiplexer receives multiplexed signals from a first telescope optical assembly and demultiplexes the signals, and a second optical signal multiplexer/demultiplexer multiplexes signals and provides the multiplexed signals to a second telescope optical assembly for transmission.

Additional features and advantages of embodiments of the present invention will become readily apparent from the following discussion, particularly when taken together with the accompanying drawings.

BRIEF DESCRIPTION OF THE DRAWINGS

FIG. 1 is a schematic depiction of the relationship between a numerous user communication device and numerous communication endpoints in accordance with embodiments of the present invention;

FIG. 2 is a block diagram depicting components of a numerous user communication device in accordance with embodiments of the present invention;

FIG. 3 is a block diagram depicting components of a communication endpoint in accordance with embodiments of the present invention;

DETAILED DESCRIPTION

Figure 4:
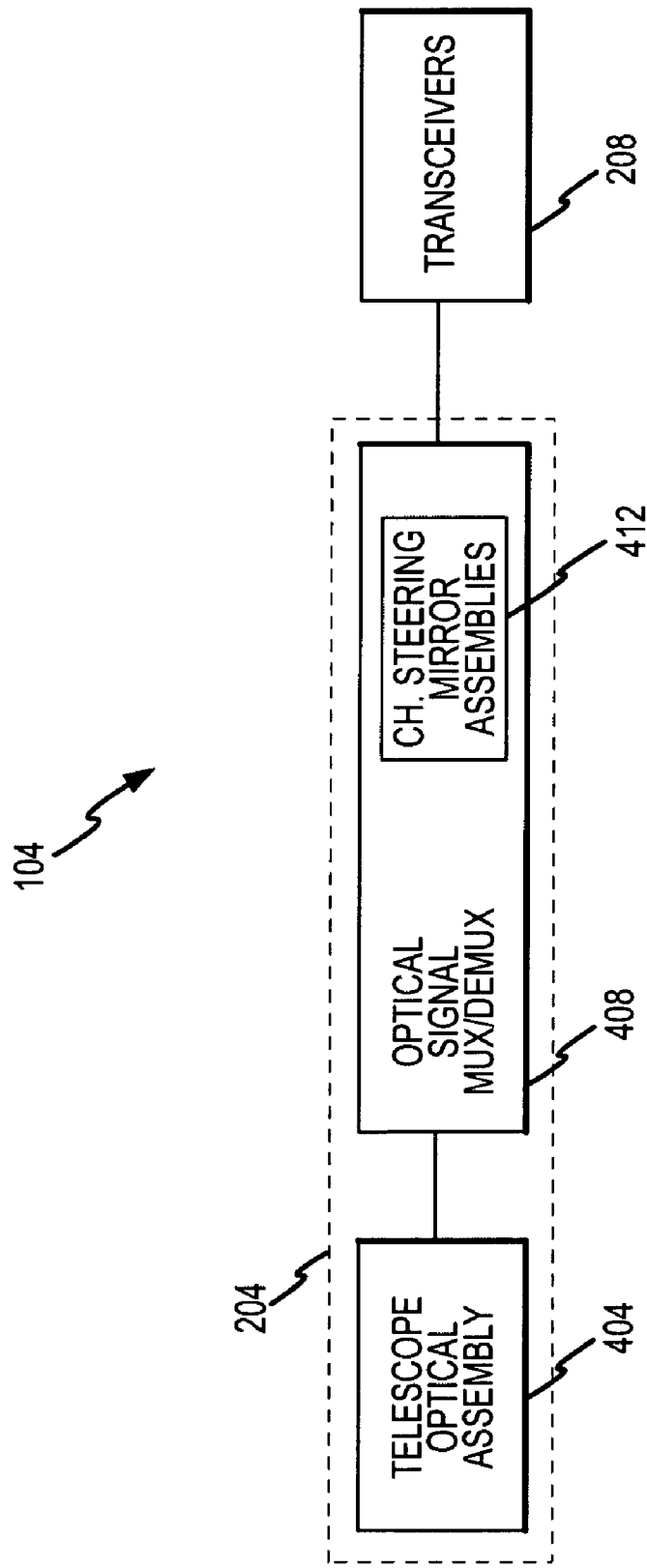
FIG. 4 is a block diagram depicting components of a numerous user communication device optical assembly in accordance with embodiments of the present invention.

With reference now to FIG. 1, the relationship between components of a numerous user laser communications optical system 100 in accordance with embodiments of the present invention is schematically depicted. In general, the communication system 100 includes a numerous user communication device 104 and one or more communication endpoints 108. As depicted in FIG. 1, the numerous user communication device 104 may comprise a satellite platform, such as a geosynchronous satellite (GEO), or some other mobile or stationary platform. Communication endpoints 108 may include or be associated with aircraft operating within the field of view of the numerous user communication device 104, or any other mobile or stationary communication endpoint within the field of view 112 of the numerous user communication device 104. In accordance with embodiments of the present invention, a numerous user communication device 104 comprising a GEO has a field of view of two degrees, providing a coverage area that corresponds to the area of a moderately sized country. Although three communication endpoints 108a-c are illustrated in FIG. 1, embodiments of a communications optical system 100 are not limited to any particular number of communication endpoints 108. In addition, a numerous user communication device 104 may be in communication with one or more other numerous user communication devices.

With reference now to FIG. 2, components of a numerous user communication device 104 in accordance with embodiments of the present invention are depicted in block diagram form. In particular, the numerous user communication device 104 generally includes an optical assembly 204 that functions to collect and demultiplex simultaneously received communication signals as part of a reception function, and to multiplex and transmit numerous communication signals as part of a transmission function. As described in greater detail elsewhere herein, the transmission and reception functions may be accomplished using a single optical aperture provided as part of the optical assembly. Alternatively, an optical assembly 204 may comprise a number of optical apertures. For example, a first optical aperture may be provided for the transmission of signals and a second optical aperture may be provided for the reception of signals. The numerous user communication device additionally includes numerous transceivers 208. In accordance with embodiments of the present invention, a single transceiver 208 comprising an optical receiver is provided for each receive channel of the numerous user communication device 104. In addition, a single transceiver 208 comprising an optical transmitter or source is provided for each transmit channel of the numerous user communication device 104. In accordance with embodiments of the present invention that feature bi-directional communications, a transceiver 208 may both transmit and receive.

With reference now to FIG. 3, components of a communication endpoint 108 that may be used in connection with a numerous user communication device 104 in accordance with embodiments of the present invention are depicted in block diagram form. In general, each communication endpoint 108 includes a communication endpoint optical assembly 304 capable of receiving and transmitting optical signals. In accordance with embodiments of the present invention, the communication endpoint optical assembly 304 transmits and receives a single channel, and therefore is not required to multiplex or demultiplex signals. In accordance with other embodiments of the present invention, multiplexing and demultiplexing capabilities may be provided, if desired. The communication endpoint 108 additionally includes an endpoint transceiver 308. The endpoint transceiver 308 may comprise an optical receiver and/or an optical transmitter or source.

A numerous user communication device 104 providing combined transmission and reception capabilities as described herein permits the use of a single telescope optical assembly, reducing the size and weight of the numerous user communication device 104, which is particularly advantageous in applications where the numerous user communication device is deployed as a satellite. Alternatively, for example in order to avoid cross-talk between the relatively high power transmitted channels and the relatively low power received channels, a first telescope optical assembly paired with a first optical multiplexer/demultiplexer could be used for the transmission of numerous channels, while a second telescope optical assembly paired with a second optical multiplexer/demultiplexer could be used for the reception of numerous channels.

With reference now to FIG. 4, components of a numerous user communication device optical assembly 204 in accordance with embodiments of the present invention having a single optical aperture are depicted in block diagram form. In general, the numerous user communication device optical assembly 204 according to FIG. 4 includes a telescope optical assembly 404, an optical signal discriminator or multiplexer/demultiplexer 408, and channel steering mirror assemblies 412. The channel steering mirror assemblies 412 may be integrated with the components of the optical signal multiplexer/demultiplexer. The telescope optical assembly 404 provides a single optical aperture and generally functions to collect or transmit optical signals (i.e. light, such as may be associated with laser beams) within the field of view of the numerous user communication device 104. The telescope optical assembly 404 therefore comprises a means for gathering light. The optical signal multiplexer/demultiplexer 408 demultiplexes the individual signals or channels received through the telescope optical assembly. In addition, the optical signal multiplexer/demultiplexer 408 multiplexes a number of laser beams comprising a number of individual signals or channels for simultaneous transmission through the telescope optical assembly 404. The optical signal multiplexer/demultiplexer 408 comprises a means for multiplexing/demultiplexing. The channel steering mirror assemblies 412 ensure that the laser beam of each channel is aimed precisely at the corresponding transceivers 208.

In general, the telescope optical assembly 404 functions to receive and/or transmit optical signals anywhere within the field of view of the telescope optical assembly 404. In accordance with an embodiment of the present invention, a telescope optical assembly for use in connection with a GEO has a 2' field of view providing a coverage diameter of about 1300 $km^2$ at the surface of the Earth. In accordance with a further embodiment of the present invention, the telescope optical assembly 404 has an entrance pupil diameter of 40 cm.

Figure 5:
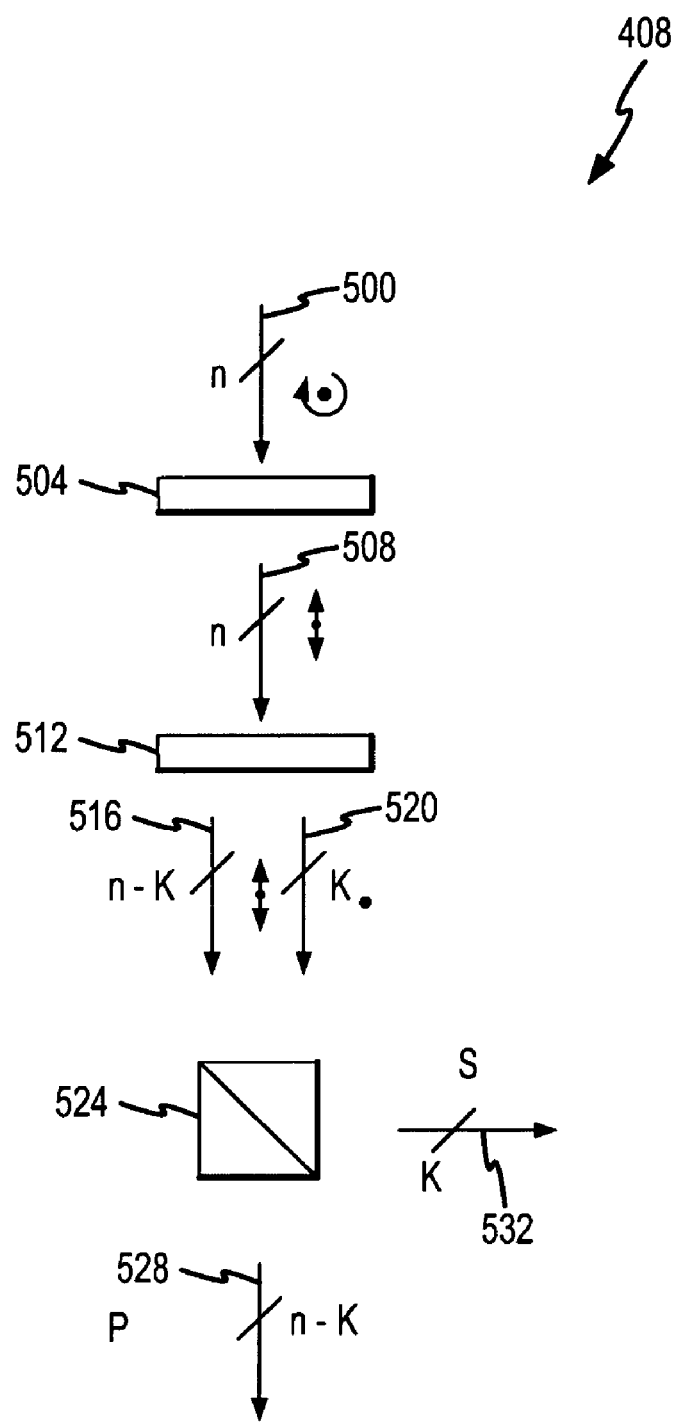
FIG. 5 schematically depicts components of an optical signal multiplexer/demultiplexer in accordance with embodiments of the present invention.

Components of an optical signal multiplexer/demultiplexer 408 in accordance with embodiments of the present invention are depicted in FIG. 5. In general, an optical signal multiplexer/demultiplexer 408 in accordance with embodiments of the present invention includes chromatic waveplates or retarder plates, hereinafter referred to as waveplates or means for differentially polarizing, and polarizing beam splitters or means for separating optical beams having different polarizations.

At least one waveplate is used to transform circularly polarized signals received by the numerous access device into linearly polarized light having a selected direction of polarization or orientation. In addition, multiple-order (or multi-order) waveplates are used for alternately or differentially polarizing signals on adjacent available channels. As can be appreciated by one of skill in the art from the description provided herein, waveplates comprise birefringent devices, with "fast" and "slow" crystal (or transmission) axes. Embodiments of the present invention may include quarter wave plates, half wave plates, multi-order waveplates and other linear retarder plates for selectively altering the polarization of light beams. As will become apparent from the description provided herein, multi-order waveplates are used in embodiments of the present invention to differentially polarize signals on adjacent channels. Examples of waveplates suitable for use in connection with embodiments of the present invention include retarders formed from crystals such as quartz or sapphire.

In addition, an optical signal multiplexer/demultiplexer 408 in accordance with embodiments of the present invention includes polarizing beam splitters. As can be appreciated by one of skill in the art, polarizing beam splitters can be constructed that reflect P-polarized light and transmit S-polarized light, or that reflect S-polarized light and transmit P-polarized light. Therefore, polarizing beam splitters can be used to separate P-polarized light from S-polarized light. As known by those of skill in the art, exemplary polarizing beam splitters include glass-immersed multilayer optical filters, non-immersed films on plates, and wiregrid polarizers.

With reference to FIG. 5, components of an optical signal multiplexer/demultiplexer 408 are depicted schematically. The description of the included components and operation of the optical signal multiplexer/demultiplexer 408 in accordance with embodiments of the present invention will generally be given in terms of a reception function. However, it should be appreciated that a multiplexer/demultiplexer 408 can also perform a transmission or multiplexing function. As can be appreciated by one of skill in the art after consideration of the present disclosure, in a transmission function, the described functions and operations are generally performed in reverse. As can also be appreciated by one of skill in the art after consideration of the present disclosure, a single optical signal multiplexer/demultiplexer 408 can perform both transmission and reception functions simultaneously. For example, in embodiments of the present invention incorporating simplex links, a signal can be received on a first channel while a signal is transmitted on a second channel. As a further example, in embodiments of the present invention incorporating diplex links, a signal can be received on a first diplex channel while a signal is transmitted on a second diplex channel. As can further be appreciated by one of skill in the art from the description provided herein, a single optical signal multiplexer/demultiplexer 408 in accordance with embodiments of the present invention can support both simplex and diplex channels.

A multiplexed optical signal 500 is received by the optical signal multiplexer/demultiplexer 408 from the telescope optical assembly 404. The multiplexed signal 500 may comprise a plurality of signals, each comprising a single data channel. Each of the signals may be transmitted by a communication endpoint 108 as light circularly polarized in either of two orthogonal directions. Accordingly, the signals received at the telescope optical assembly are circularly polarized, and the multiplexed signal 500 provided by the telescope optical assembly to the optical signal multiplexer/demultiplexer 408 may therefore comprise circularly (or elliptically) polarized light. In accordance with embodiments of the present invention, the received signals 400 have about the same polarization state (i.e. are circularly (or elliptically) polarized in the same direction).

The received signals 500 are passed through a linearizing waveplate 504, which may comprise a quarter wave plate, that transforms the signals 500 into linearly polarized signals 508. Furthermore, the plane within which the signals 508 are polarized by the linearly waveplate 504 is selected to be compatible with the operation of other components of the multiplexer/demultiplexer 408. The linearizing waveplate 504 may transform the circularly polarized signals 500 into P-polarized signals (or alternatively S-polarized signals) 508. The linearly polarized signals 508 are then passed through a first differentiating waveplate 512.

The first differentiating waveplate 512 is aligned such that the crystal axes of the birefringent differentiating waveplate 512 are each at an angle of about 45° to the plane of the linearly polarized light 508. For example, the first differentiating waveplate is designed such that the crystal axes of the waveplate are at an angle of 45°±5° to the plane of the linearly polarized signals 508. Accordingly, energy from the received linearly polarized light 508 is transmitted along both crystal axes of the waveplate 512 as first and second electrical field (E field) components. The first differentiating waveplate 512 operates to retard a first E field component of some of the now linearly polarized signals 508 originating from one or more communication endpoints 108 by an even wavelength interval with respect to a second E field component that is orthogonal to the first E field component. Signals with a first component that is retarded by about an integer number of waves (for example, an integer number of waves±1 nm for a set of signals including a signal with a wavelength of around 1600 nm) with respect to a second component are referred to herein as even signals. That is, the orthogonal first and second E field components of the even signals are passed by the first differentiating waveplate 512 in an integer multiple of waves, and the polarization of such signals is not altered. Accordingly, even signals passed through the first differentiating waveplate 512 (signals 516) have a polarization that is the same as their polarization before passing through the first differentiating waveplate 512. For example, where the linearly polarized signals 508 incident upon the first differentiating waveplate 512 had a P-polarization, the even signals continue to be P-polarized. The first differentiating waveplate 512 also functions to retard a first E field component of other of the linearly polarized signals 508 with respect to a second E field component that is orthogonal to the first E field component by an integer multiple of waves plus or minus about one-half a wave (for example, an integer number of waves plus or minus one-half a wave±1 nm). Signals with a first E field component that is retarded by an integer number of waves plus or minus about one-half a wave with respect to the second E field component are referred to herein as odd signals. As a result of this integer number of wavelengths plus or minus one-half a wavelength difference the polarization of odd signals is rotated. Accordingly, the odd signals passed through the first differentiating waveplate 512 (signals 520) have a polarization that is the opposite of their polarization before passing through the first differentiating waveplate 512. For example, if the linearly polarized signals 508 were P-polarized, the odd signals 520 are S-polarized after passing through the first differentiating waveplate 512. In accordance with embodiments of the present invention, the differentiating waveplate 512 is a multiple order waveplate. Accordingly, a differentiating waveplate 512 may be formed from a material or combination of materials having an effective birefringence and a thickness such that the retardance of the signal passing through the waveplate is a large (e.g., more than 10) number of waves.

In order to achieve the selective polarization of incident linearly polarized signals 508, the channel frequencies utilized by those signals are selected so that they fall on the allowed channels of a frequency grid. The allowed channels of the frequency grid have wavelengths that are determined with reference to the retardance of the first differentiating waveplate 512. The differential retardance of a waveplate is as follows:

$$\text{Retardance} = t \cdot (n_e - n_0),$$

where t is the thickness of the waveplate, $n_e$ is the index of refraction of the waveplate for one polarization direction or crystal axis, and $n_0$ is the index of refraction of waveplate for the other (opposite) polarization direction or crystal axis. The number of waves in which a first E field component aligned with the crystal axis of the waveplate 512 having an index of refraction $n_0$ passes through the waveplate 512 is equal to $t \cdot n_0$. The number of waves in which a second E field component aligned with the crystal axis of the waveplate 512 having an index of refraction $n_e$ is equal to $t \cdot n_e$. Accordingly, the number of waves by which a first E field component of a signal having a wavelength λ is retarded by the waveplate with respect to a second E field component that is orthogonal to the first is as follows:

$$\# \text{waves} = \frac{t \cdot (n_e - n_0)}{\lambda}.$$

For purposes of illustration only, and not intending to limit any embodiment of the present invention to any particular signal frequencies or differentiating waveplate configuration, the following numerical example is provided. A waveplate having a thickness of 10 mm and a value $n_e - n_0 = 0.008$ is selected. The retardance of this selected waveplate = $t \cdot (n_e - n_0) = 1 \times 10^4$ micron × 0.008 = 8 micron. A first even wavelength is then selected. For instance, a first wavelength ($\lambda_1$) equal to 1600.000 nm may be selected. The differential retardance of the waveplate in waves at the first wavelength is equal to $$\frac{t \cdot (n_e - n_0)}{\lambda} = \frac{10\text{mm}(0.008)}{\lambda} = \frac{8 \mu m}{1600.000 \, \text{nm}} = 50.$$

Accordingly, the electrical field components of a signal having a wavelength of 1600.000 nm that are aligned with the crystal axes of the waveplate 512 will both pass through this example waveplate in an integer number of waves. Having determined a first even wavelength with respect to the waveplate, a first odd wavelength, corresponding to a second channel, can be determined. In order to achieve minimal spacing between adjacent channels, a wavelength with one electrical field component that will pass through the waveplate with a retardation of 50+/−0.5 waves with respect to an orthogonal electrical field component is selected. For purposes of the present example, the first odd wavelength will be selected such that one electrical field component is retarded by the waveplate in 50.5 wavelengths with respect to the orthogonal electrical field component. This first odd wavelength ($\lambda_2$) can be determined from the following equation:

$$\lambda_2 = \frac{t \cdot (n_e - n_0)}{\# \text{waves}} = \frac{8 \mu m}{50.5} = 1584.158 \text{ nm}.$$

Similarly, a second even wavelength ($\lambda_3$) can be determined by selecting a retardation of 50+/−one wave for one electrical field component with respect to the orthogonal electrical field component. In order to place $\lambda_3$ in the next possible channel adjacent $\lambda_2$, that wavelength will be selected so that one electrical field component is retarded by 51 waves with respect to the orthogonal electrical field component. Accordingly, $\lambda_3$ can be calculated as follows:

$$\lambda_3 = \frac{t \cdot (n_e - n_0)}{\# \text{waves}} = \frac{8 \mu m}{51} = 1568.627 \text{ nm}.$$

Using the same methodology, $\lambda_4$, the second odd channel, can be calculated as follows:

$$\lambda_4 = \frac{8 \mu m}{51.5} = 1553.398 \text{ nm}.$$

This calculation can be continued to include more wavelengths.

Figure 6A:
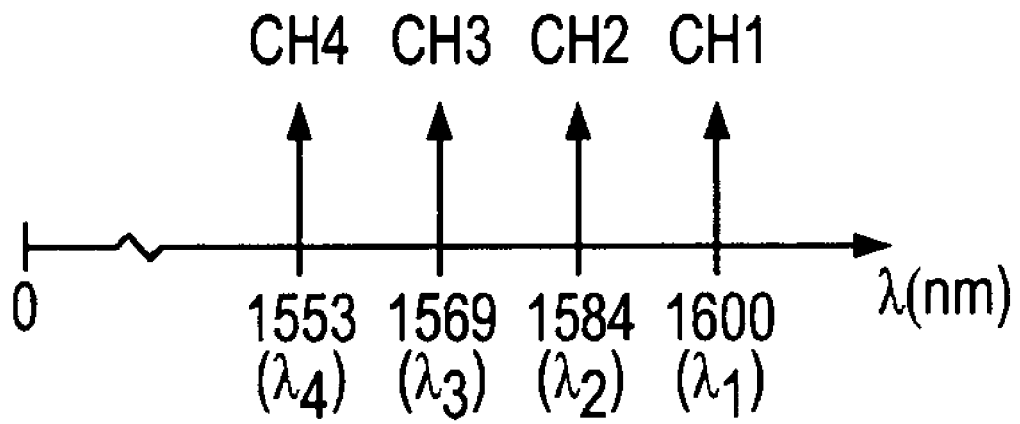
FIG. 6A depicts an example channel grid in accordance with embodiments of the present invention in wavelength space.
Figure 6B:
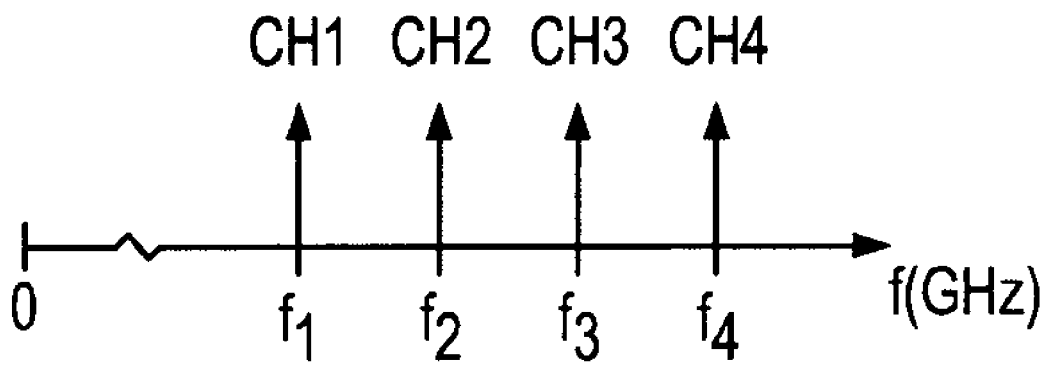
FIG. 6B depicts an example channel grid in accordance with embodiments of the present invention in frequency space.

As can be appreciated by one of skill in the art from the description provided herein, the spacing between adjacent channels is regular in frequency space, while there are slight variations between adjacent channels and wavelength space. The channel grid showing the spacings of the channels calculated in the foregoing example are illustrated in wavelength space in FIG. 6A. The channel grid showing the spacings of the channels calculated in the foregoing example are illustrated in frequency space in FIG. 6B.

As can be appreciated by one of skill in the art after consideration of the present disclosure, a frequency grid can also be determined by selecting a first signal wavelength corresponding to a first channel. An appropriate multiple order waveplate 512 can then be determined that will retard one electrical field component of the first signal wavelength in an integer multiple of waves with respect to a second, orthogonal electrical field component (if the first signal wavelength is to be an even signal); or that will retard one electrical field component of the first signal wavelength in an integer multiple of waves plus (or minus) one-half a wave with respect to a second, orthogonal electrical field component (if the first signal wavelength is to be an odd signal). The remaining signal wavelengths comprising the remainder of the frequency grid can then be calculated as in the illustration set forth above.

The actual frequencies of each channel should be about the nominal frequencies established for the frequency grid, but they do not need to be exact. For example, in accordance with embodiments of the present invention, the actual frequency of a channel may be within about one-quarter of the nominal gap to the next (or previous) channel. As can be appreciated by one of skill in the art from the description provided herein, as a channel's actual frequency moves from its nominal frequency, it will tend to become attenuated. However, if a maximum offset of about one-quarter of the gap to an adjacent frequency is maintained, satisfactory separation between channels can be achieved.

As can also be appreciated by one of skill in the art from the description provided herein, the higher order the first differentiating waveplate 512 is, the closer adjacent channels may be in wavelength. For example, as in the illustration set forth above, a first differentiating waveplate 512 that retards one E field component of a signal having a wavelength of about 1600 nm by 50 waves with respect to the orthogonal E field component can alternately polarize an adjacent signal that has a wavelength of about 1600 nm plus or minus about 16 nm. Accordingly, continuing this example, a frequency grid comprising four separate channels can be supported within a spectrum that spans about 48 nm in wavelength. As can be appreciated by one skilled in the art, the thickness or birefringence can be chosen such that the number of channels can match any arbitrary frequency grid.

With continued reference now to FIG. 5, the alternately polarized signals 516, 520 are separated from one another by a first polarizing beam splitter 524. The first polarizing beam splitter 524 reflects a first one of the oppositely polarized signal sets 516, 520 and transmits a second one of the oppositely polarized signal sets 516, 520. For example, if the first polarizing beam splitter 524 is arranged so that it transmits P-polarized light and reflects S-polarized light, the first polarizing beam splitter 524 will transmit the set of P-polarized even signals as a primary set of even signals 528, and reflect the S-polarized odd signals 520 as a primary set of odd signals 532. For instance, continuing the foregoing example in which four possible channels on a grid were defined, signals having wavelengths of about 1600 nanometers ($\lambda_1$), and about 1569 nanometers ($\lambda_3$), which comprise the even signals, may be transmitted as the primary set of even signals 528 by the first polarizing beam splitter 524. Furthermore, signals having wavelengths of about 1584 nanometers ($\lambda_2$), and about 1553 nanometers ($\lambda_4$), comprise the primary set of odd signals 532 that are reflected by the first polarizing beam splitter 524.

As can be appreciated by one of skill in the art from the description provided herein, a signal need not be present on every available channel. If the primary set of even signals 528 or the primary set of odd signals 532 includes signals on multiple channels, then those signals may be separated from one another using additional signal separation stages. Such additional separation stages may comprise a differentiating waveplate and polarizing beam splitter as described in connection with FIG. 5. In a system where the available channels are evenly spaced and in which an even number of the available channels are even channels, and an even number of the available channels are odd channels, each stage separates the signals it receives into two separate paths until only a single signal wavelength is included in a path. As an alternative to additional separation stages comprising a differentiating waveplate and polarizing beam splitter as described herein, such separation stages may comprise a 45° dichroic separation filter or band pass filter arrangements.

Figure 7:
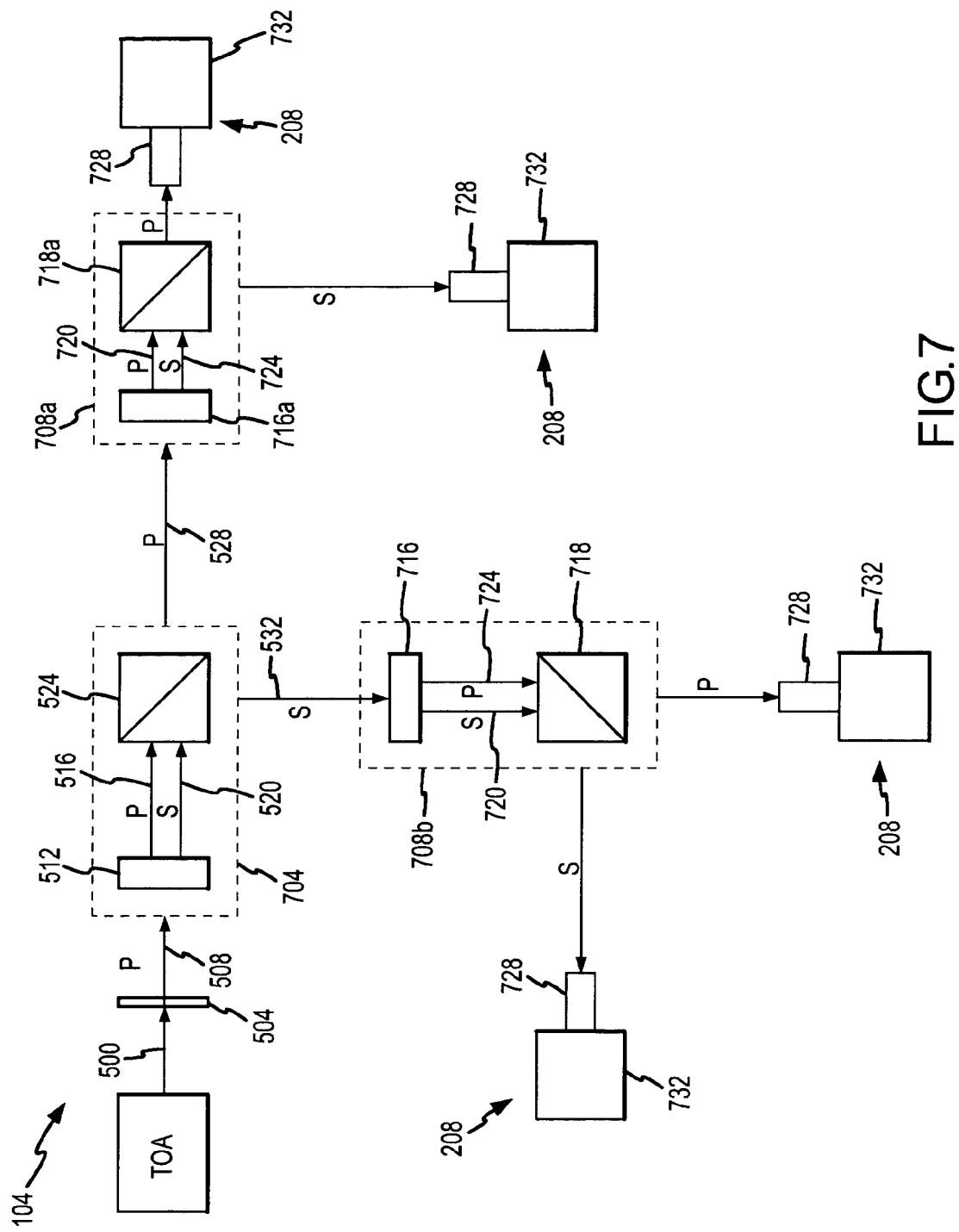
FIG. 7 schematically depicts components of an optical signal multiplexer/demultiplexer in accordance with other embodiments of the present invention.

With reference now to FIG. 7, a numerous user communication device 104 having multiple stages is illustrated. In particular, FIG. 7 illustrates a numerous user communication device 104 having a primary signal separation stage 704, and two secondary signal separation stages 708a, 708b. The primary signal separation stage 704 generally comprises a first differentiating waveplate 512 and a first polarizing beam splitter 524, for example as described in connection with FIG. 5. Where the received signal 500 contains four signals falling on channels of the supported frequency grid, and where two of those signals are even signals, and two are odd signals, then the even signals 528 output by the first signal separation stage 704 comprise two even signals, and the odd signals 532 output by the first signal separation stage 704 comprise two odd signals. Continuing the previous example, after passing through the linearizing quarter waveplate 504, the polarized received signals 508 are P-polarized. Accordingly, the primary even signals 516 are P-polarized while the primary odd signals 520 are S-polarized after passing through the first differentiating waveplate 512. Although the primary even 516 and the primary odd 520 signals are shown by separate arrows, it can be appreciated that the primary odd 516 and the primary even 520 signals need not be spatially separated before they reach the first polarizing beam splitter 524. The first polarizing beam splitter 524 then separates the P-polarized primary even signals 516 (as signals 528) from the S-polarized primary odd signals 520 (as signals 532). For example, the P-polarized primary even signals 528 may be transmitted by the polarization beam splitter 524 so that they follow a first path, while the S-polarized primary odd signals 532 may be reflected so that they follow a second path. The first path followed by the primary set of even signals 528 leads to the secondary even signal separation stage 708a, while the second path followed by the primary set of odd signals 532 leads to the secondary odd signal separation stage 708b. The secondary signal separation stages 708 each generally comprise a second differentiating waveplate 716 and a second polarizing beam splitter 718. As can be appreciated by one of skill in the art, the thickness and/or index of refraction of the second differentiating waveplates 716 differ from that of the first differentiating waveplate 512. In particular, because the separation between the individual signals received by the secondary even signal separation stages 708 is twice that of the signals 508 received by the primary signal separation stage 704, the retardance of the second differentiating waveplates 716 is about half the retardance of the first differentiating waveplate 512.

The second differentiating waveplates 716 are configured, through selection of thickness and index of refraction, to pass some of the signals included in the primary signal sets 528, 532 such that one electrical field component of those signals is delayed by an integer number of Wavelengths with respect to an orthogonal electrical field component, thereby forming secondary sets of even signals 720a and 720b. The waveplates 716 additionally are configured to pass other of the signals included in the primary signal sets 528, 532 such that one electrical field component of those signals is delayed by an integer number of waves+/−0.5 waves with respect to an orthogonal electrical field component, thereby forming secondary sets of odd signals 724a and 724b that are oppositely polarized from the secondary sets of even signals 720. The second polarizing beam splitter 718 in each of the secondary signal separation stages then divides the now oppositely polarized secondary even 720 and odd 724 signals from one another.

Provided the received signals 500 contain no more than two even signals and no more than two odd signals, the primary signal separation stage 704 and the two secondary separation stages 708 are capable of providing a single signal, comprising a single channel, to a receiving fiber 728. Where, as in the present example, the numerous user communication device 104 operates to receive signals, the receiving fiber 728 associated with each channel may be paired with a transceiver 732 comprising a receiver. As noted elsewhere herein, and as can be appreciated by one of skill in the art, a numerous user communication device 104 may also be used to multiplex signals for transmission or to transmit and receive signals on different channels simultaneously. Accordingly, a transceiver 732 may also comprise a transmitter or a combined receiver and transmitter.

As can also be appreciated by one of skill in art from the description provided herein, a frequency grid of supported channels may be expanded to support more than four channels. Such additional channels can be accommodated by providing additional separation stages. For instance, if the frequency grid used in the previous examples were expanded to include eight adjacent channels, the additional channels could be supported by the addition of four tertiary separation stages to separate the outputs from the secondary signal sets output by the secondary separation stages 708 into individual channels. In addition, it can be appreciated that an initial stage or stages of separation using multiple order waveplates 512, 716 in combination with polarizing beam splitters 524 as described herein results in the separation of interleaved signals, such that the interval between adjacent signals is doubled with each separation stage 704, 708. Accordingly, scaling of a wavelength multiplexer/demultiplexer assembly 408 can be accomplished by adding additional separation stages.

An optical multiplexer/demultiplexer 408 in accordance with embodiments of the present invention may also include optical bandpass or bandstop filters. Optical bandpass filters function to transmit light having a wavelength within the passband of the filter, while reflecting light outside of the passband. Bandstop filters reflect light inside the stopband and transmit light outside. In addition, the filters preferably do not alter the polarization of light that is passed through or incident upon the filter. For example, the retardance on reflection is independent of out-of-band wavelength, and thus the retardance is zero or 180°. Examples of bandpass filters suitable for use in connection with embodiments of the present invention include, but are not limited to, Fabry-Perot filters having one or more cavities formed by a stack of dielectrics. Furthermore, it can be appreciated that, even with the addition of successive stages, an optical signal multiplexer/demultiplexer 408 in accordance with embodiments of the present invention is configured such that rays incident upon each bandpass filter are substantially normal to components such as waveplates 512, 716.

Figure 8:
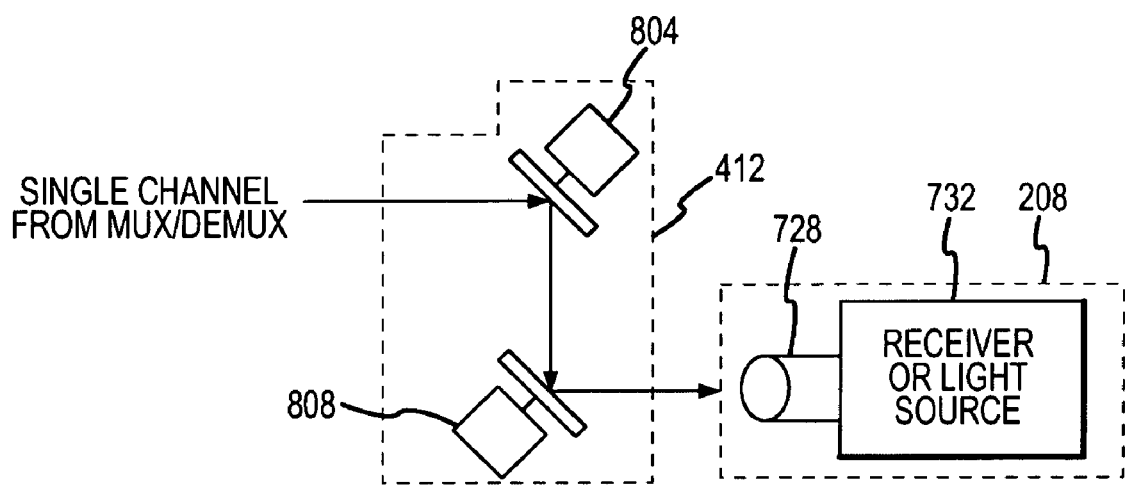
FIG. 8 schematically depicts components of a channel steering mirror assembly in accordance with embodiments of the present invention.

With reference now to FIG. 8, a channel steering mirror assembly 412 and a transceiver 208 in accordance with an embodiment of the present invention are schematically depicted. In general, the channel steering mirror assembly 412 may include a steering mirror 804. The steering mirror 804 functions to direct a beam containing a single channel of the communication system 100 towards the boresight of a fixed receiver or receiving fiber. The inclusion of a steering mirror 804 with each channel steering mirror assembly 412 is considered desirable, because the proper functioning of optical transceivers 208 requires that a received ray be centered upon the boresight of the receiving fiber or detector 728 with great precision. In particular, because each channel supported by a numerous user communication device 104 may be established with a different communication endpoint 108, and because each communication endpoint 108 may appear anywhere within the field of view of the numerous user communication device 104, the ability to separately steer individual signals is desirable. Accordingly, the steering mirror 804 may be used to direct the beam provided by the optical signal multiplexer/demultiplexer, ensuring that the beam can be positioned on the boresight of the receiving fiber 728 of the optical transceiver's 208 receiver 732. Aiming of the steering mirror 804 may be accomplished using a focal plane array for initial position information as is known in the art.

The fast fine steering mirror 808 is configured to allow for the correction of jitter associated with the numerous user communication device 104. Accordingly, relatively high frequency vibrations having a small amplitude can be removed by the fast fine steering mirror 808. The ray from the fast fine steering mirror 808 is then directed to the receiving fiber 728. Aiming of the FSM may be effected using an error signal generated by a nutating mirror or fiber as is known in the art. As can be appreciated by one of skill in the art, a receiver may comprise a low noise EDFA preamplifier with PIN or avalanche photodiode or an avalanche photodiode alone.

In a transmitting mode or configuration, the optical transceiver 208 may comprise a laser transmitter or light source 732 that may include a fiber or amplifier. A transceiver 732 comprising a transmitter is configured to provide a signal having a polarization and wavelength appropriate to the associated channel. As can be appreciated by one of skill in the art, a transmitter may comprise a tuned laser amplified by erbium-doped fiber amplifiers coupled in with the appropriate polarization.

In accordance with another embodiment of the present invention, instead of a fast fine steering mirror 808 being included as part of each channel steering mirror assembly 412, a single fast fine steering mirror 808 is provided. In particular, a single fast fine steering mirror 808 can be positioned to receive the multiplexed signal 500 (see, e.g., FIG. 5) directly from the telescope optical assembly 404, or after the light has passed through the linearizing wave plate 504 of the optical signal multiplexer/demultiplexer 408, to remove jitter from the multiplexed signal 500. According to such an embodiment, each channel steering mirror assembly 412 could then omit the fast fine steering mirror 808, and include only a steering mirror 804 for each channel to direct the ray containing the demultiplexed signal to the receiving (or transmitting) fiber 728 of the transceiver 732. The use of a single fast fine steering mirror 808 is possible because the function of such a mirror is to remove jitter introduced by the numerous user communication device 104 itself. Such a use places strict requirements on the afocal magnification uniformity (distortion) for the telescope.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for demultiplexing optical signals, comprising:

simultaneously receiving at a telescope having a first aperture a plurality of optical signals transmitted from at least a first remote source, said optical signals spaced from one another substantially regularly in frequency and having the same polarization, said optical signals including a primary set of even signals including at least one even signal and a primary set of odd signals including at least one odd signal, wherein said plurality of optical signals comprise a plurality of communication channels;

retarding a first electrical field component of said at least one primary even signal with respect to a second electrical field component of said at least one primary even signal by about an integer multiple of wavelengths of said at least one primary even signal, wherein said at least one primary even signal has a first polarization after said retarding;

retarding a first electrical field component of said at least one primary odd signal with respect to a second electrical field component of said at least one primary odd signal by an integer multiple of wavelengths plus about one-half a wavelength, wherein said at least one primary even signal and said at least one primary odd signal are approximately oppositely polarized from one another, wherein said at least one primary odd signal has a second polarization after said retarding;

directing said at least one primary even signal having said first polarization along a first path; and directing said at least one primary odd signal having said second polarization along a second path.

2. The method of claim 1, further comprising:

linearizing a polarization of said plurality of received optical signals before retarding.

3. The method of claim 1, further comprising:

receiving said at least one even signal directed along said first path at a first receiver; and receiving said at least one odd signal directed along said second path at a second receiver.

4. The method of claim 1, wherein said retarding a first electrical field component of said at least one even signal with respect to a second electrical field component of said at least one even signal by about an integer number of wavelengths and said retarding a first electrical field component of at least one odd signal with respect to a second electrical field component of said at least one odd signal by about an integer number of wavelengths plus about one-half a wavelength comprises passing said plurality of optical signals through a first waveplate, wherein said first waveplate has indices of refraction along transmission axes of said first waveplate and a thickness such that said first electrical field component of said at least one primary even signal is retarded with respect to said second electrical field component of said at least one primary even signal by said first waveplate by about an integer multiple of wavelengths and such that said first electrical field component of said at least one primary odd signal is retarded with respect to said second electrical field component of said at least one primary odd signal by said first waveplate by an integer multiple of wavelengths plus about one-half a wavelength.

5. The method of claim 1, wherein said plurality of optical signals includes a plurality of at least one of said at least one even signal and said at least one odd signal, the method further comprising:

separating said plurality of at least one of said at least one even signal and said at least one odd signal using at least one of a bandpass and a bandstop filter in combination with a second polarizing beam splitter.

6. The method of claim 1, wherein said plurality of optical signals includes a plurality of at least one of said at least one even signal and said at least one odd signal, the method further comprising:
separating said plurality of at least one of said at least one even signal and said at least one odd signal using a tilted dichroic filter.

7. The method of claim 1, wherein said plurality of optical signals are received from a telescope having a single aperture.

8. The method of claim 1, further comprising:
directing one primary even signal to a first receiver; and
directing one primary odd signal to a second receiver.

9. A method for demultiplexing optical signals, comprising:
receiving at a telescope having a first aperture a plurality of optical signals, said optical signals spaced from one another substantially regularly in frequency and having the same polarization, said optical signals including a primary set of even signals including at least one even signal and a primary set of odd signals including at least one odd signal, wherein at least first and second even signals are included in said primary set of even signals, and wherein at least first and second odd signals are included in said primary set of odd signals;
retarding a first electrical field component of said at least one primary even signal with respect to a second electrical field component of said at least one primary even signal by about an integer multiple of wavelengths of said at least one primary even signal, wherein said at least one primary even signal has a first polarization after said retarding;
retarding a first electrical field component of said at least one primary odd signal with respect to a second electrical field component of said at least one primary odd signal by an integer multiple of wavelengths plus about one-half a wavelength, wherein said at least one primary even signal and said at least one primary odd signal are approximately oppositely polarized from one another, wherein said at least one primary odd signal has a second polarization after said retarding;
directing said at least one primary even signal having said first polarization along a first path, wherein said directing said at least one primary even signal having said first polarization along a first path comprises directing said first and second even signals along said first path, wherein said first even signal comprises a first secondary even signal and said second even signal comprises a first secondary odd signal;
directing said at least one primary odd signal having said second polarization along second path, wherein said directing said at least one primary odd signal having said second polarization along said second path comprises directing said first and second odd signals along said second path, wherein said first odd signal comprises a second secondary odd signal and said second odd signal comprises a second secondary even signal;
retarding a first electrical field component of said first secondary even signal with respect to a second electrical field component of said first secondary even signal by about an integer multiple of wavelengths of said first secondary even signal, wherein said first secondary even signal has said first polarization after said retarding;
retarding a first electrical field component of said first secondary odd signal with respect to a second electrical field component of said first secondary odd signal by an integer multiple of wavelengths plus about one-half a wavelength, wherein said first secondary odd signal has a second polarization after said retarding, wherein said first secondary even signal and said first secondary odd signal are approximately oppositely polarized from one another;
directing said first secondary even signal having said first polarization along a third path;
directing said first secondary odd signal having said second polarization along a fourth path;
retarding a first electrical field component of said second secondary even signal with respect to a second electrical field component of said second secondary even signal by about an integer multiple of wavelengths of said second secondary even signal, wherein said second secondary even signal has said first polarization after said retarding;
retarding a first electrical field component of said second secondary odd signal with respect to a second electrical field component of said second secondary odd signal by an integer multiple of wavelengths plus about one-half a wavelength, wherein said second secondary odd signal has a second polarization after said retarding, wherein said second secondary even signal and said second secondary odd signal are approximately oppositely polarized from one another;
directing said second secondary even signal having said first polarization along a fifth path; and
directing said second secondary odd signal having said second polarization along a sixth path.

10. The method of claim 9, wherein said retarding a first electrical field component of said first secondary even signal with respect to a second electrical field component of said first secondary even signal by about an integer multiple of wavelengths of said first secondary even signal and said retarding a first electrical field component of said first secondary odd signal with respect to a second electrical field component of said first secondary odd signal by an integer multiple of wavelengths plus about one-half a wavelength comprises passing said first secondary even signal and said first secondary odd signal through a second waveplate, wherein said second waveplate has indices of refraction along transmission axes of said second waveplate and a thickness such that said first electrical field component of said first secondary even signal is retarded with respect to said second electrical field component of said first secondary even signal by said second waveplate by about an integer multiple of wavelengths, and wherein said first electrical field component of said first secondary odd signal is retarded with respect to said second electrical field component of said first secondary odd signal by said second waveplate by an integer multiple of wavelengths plus about one-half a wavelength.

11. A communication device, comprising:
a telescope having a first aperture;
a first differentiating waveplate having a first area, wherein said first differentiating waveplate receives optical signals collected by said telescope, wherein said first differentiating waveplate has fixed indices of refraction and a thickness selected such that a first optical signal having a first wavelength and having a first polarization when received anywhere within said area of said first differentiating waveplate exits said first differentiating waveplate having said first polarization, wherein a second optical signal having a second wavelength and having said first polarization when received anywhere within said area of said first differentiating waveplate exits said first differentiating waveplate having a second polarization, wherein said first differentiating waveplate retards at least one component of said first signal by an integer number of wavelengths, and wherein said first differentiating waveplate retards at least one component of said second signal by an integer number of wavelengths plus or minus about one-half a wavelength; and a first polarizing beam splitter, wherein said first polarizing beam splitter receives said first and second optical signals from said first differentiating waveplate, wherein said first polarizing beam splitter directs said first optical signal having said first polarization along a first path, and wherein said first polarizing beam splitter directs said second optical signal having said second polarization along a second path.

12. The system of claim 11, wherein said first differentiating waveplate has a first index of refraction in a first direction and a second index of refraction in a second direction, and wherein said first index of refraction is different than said second index of refraction.

13. The system of claim 11, wherein said first differentiating waveplate has a thickness and indices of refraction such that it retards an electrical component of said first optical signal by no less than 50 waves with respect to a second electrical component of said first optical signal.

14. The system of claim 11, further comprising a linearizing waveplate in an optical path between said telescope and said first differentiating waveplate, wherein said linearizing waveplate transforms signals received by said telescope as circularly polarized optical signals to signals having said first polarization, wherein said first polarization is a linear polarization.

15. The system of claim 14, wherein said first differentiating waveplate is a birefringent waveplate with crystal axes that are aligned at an angle of about 45 degrees to a plane of said first polarization.

16. The system of claim 11, further comprising:
a receiving fiber, wherein said receiving fiber receives an optical signal from one of said first polarizing beam splitter and a second polarizing beam splitter.

17. The system of claim 11, wherein said first differentiating waveplate comprises a multiple order waveplate.

18. A communication device, comprising:
a telescope having a first aperture;
a first differentiating waveplate, wherein said first differentiating waveplate receives optical signals collected by said telescope, wherein said first differentiating waveplate has indices of refraction and a thickness selected such that a first optical signal having a first wavelength and having a first polarization when received at said first differentiating waveplate exits said first differentiating waveplate having said first polarization, wherein a second signal having a second wavelength and having said first polarization when received at said first differentiating waveplate exits said first differentiating waveplate having a second polarization, and wherein a third optical signal having a third wavelength and having said first polarization when received at said first differentiating waveplate exits said first differentiating waveplate having said first polarization;
a first polarizing beam splitter, wherein said first polarizing beam splitter receives said first, second, and third optical signals from said first differentiating waveplate, wherein said first polarizing beam splitter directs said first optical signal having said first polarization along a first path, wherein said first polarizing beam splitter directs said second optical signal having said second polarization along a second path, and wherein said first polarizing beam splitter directs said third optical signal having said first polarization along said first path;

a second differentiating waveplate, wherein said second differentiating waveplate receives said first and third optical signals directed along said first path by said first polarizing beam splitter, wherein said second differentiating waveplate has indices of refraction and a thickness selected such that said first optical signal having a first optical wavelength and said first polarization when received at said second differentiating waveplate exits said second differentiating waveplate having said first polarization, and wherein said third signal having a third wavelength and having said first polarization when received at said second differentiating waveplate exits said second differentiating waveplate having said second polarization; and a second polarizing beam splitter, wherein said second polarizing beam splitter receives said first optical signal and said third optical signal from said second differentiating waveplate, and wherein said second polarizing beam splitter directs said first optical signal having said first polarization along a third path, and wherein said second polarizing beam splitter directs said third optical signal having said second polarization along a fourth path.

19. The system of claim 18, further comprising:
a fast steering mirror interposed between at least one of said first polarizing beam splitter and a second polarizing beam splitter, wherein said fast steering mirror directs at least one optical signal towards said receiving fiber.

20. A communication device, comprising:
a telescope having a first aperture;
a first differentiating waveplate, wherein said first differentiating waveplate receives optical signals collected by said telescope, wherein said first differentiating waveplate has indices of refraction and a thickness selected such that a first optical signal having a first wavelength and having a first polarization when received at said first differentiating waveplate exits said first differentiating waveplate having said first polarization, and wherein a second signal having a second wavelength and having said first polarization when received at said first differentiating waveplate exits said first differentiating waveplate having a second polarization;
a first polarizing beam splitter, wherein said first polarizing beam splitter receives said first and second optical signals from said first differentiating waveplate, wherein said first polarizing beam splitter directs said first optical signal having said first polarization along a first path, and wherein said first polarizing beam splitter directs said second optical signal having said second polarization along a second path;
a first transmitting fiber, wherein said first transmitting fiber generates a third optical signal having a third wavelength and said first polarization that is received by said first polarizing beam splitter, wherein said third optical signal is directed to said first waveplate, and wherein said third optical signal leaves said first waveplate and enters said telescope having a circular polarization; and
a second transmitting fiber, wherein said first transmitting fiber generates a fourth optical signal having a fourth wavelength and said second polarization that is received by said first polarizing beam splitter, wherein said fourth optical signal is directed to said first waveplate, and wherein said fourth optical signal leaves said first waveplate and enters said telescope having said circular polarization.

21. A communication system, comprising:

means for gathering light, wherein said light comprises a plurality of optical signals received at said means for gathering light simultaneously, and wherein said plurality of optical signals comprise a plurality of communication channels;

means for multiplexing/demultiplexing at least some of said plurality of optical signals, wherein said means for multiplexing/demultiplexing at least some of said plurality of optical signals further comprise means for retarding at least one component of said signals by an integer number of wavelengths and means for retarding at least one component of said signals by an integer number of wavelengths plus or minus about one-half a wavelength; and means for receiving/transmitting said at least some of said optical signals, wherein said at least some of said optical signals passed between said means for multiplexing/demultiplexing are at least one of received and generated.

22. The system of claim 21, wherein said means for multiplexing/demultiplexing comprise a first means for differentially polarizing, wherein adjacent ones of said optical signals alternate between even and odd channels, wherein even optical signals passed to said means for multiplexing/demultiplexing by said means for gathering light pass through said means for differentially polarizing without having their polarization altered, and wherein odd optical signals passed to said means for multiplexing/demultiplexing by said means for gathering light pass through said means for differentially polarizing with their polarization changed to a polarization that is about opposite the polarization of said even optical signals.

* * * * *

UNITED STATES PATENT AND TRADEMARK OFFICE
CERTIFICATE OF CORRECTION

PATENT NO. : 7,668,468 B1 Page 1 of 1
APPLICATION NO. : 11/238755
DATED : February 23, 2010
INVENTOR(S) : Lewis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Seventh Day of December, 2010

David J. Kappos
*Director of the United States Patent and Trademark Office*